(12) United States Patent
Lin

(10) Patent No.: US 10,320,883 B2
(45) Date of Patent: Jun. 11, 2019

(54) DEVICE FOR AND METHOD OF TRANSMITTING FILE

(71) Applicant: SAMSUNG ELECTRONICS CO., LTD., Suwon-si (KR)

(72) Inventor: Zhenpeng Lin, Science City (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 366 days.

(21) Appl. No.: 14/718,591

(22) Filed: May 21, 2015

(65) Prior Publication Data

US 2015/0341419 A1   Nov. 26, 2015

(30) Foreign Application Priority Data

May 21, 2014   (CN) ........................ 2014 1 0216465
Apr. 22, 2015   (KR) ........................ 10-2015-0056895

(51) Int. Cl.
  *H04L 29/08* (2006.01)
  *G06F 3/0482* (2013.01)
  *H04W 4/02* (2018.01)
  *H04W 4/80* (2018.01)
  *H04W 88/06* (2009.01)

(52) U.S. Cl.
  CPC .......... *H04L 67/06* (2013.01); *G06F 3/0482* (2013.01); *H04L 67/10* (2013.01); *H04W 4/02* (2013.01); *H04W 4/023* (2013.01); *H04W 4/80* (2018.02); *H04W 88/06* (2013.01)

(58) Field of Classification Search
  CPC . H04M 1/7253; H04M 2250/64; H04L 67/06; H04L 45/124; H04W 4/02; H04W 4/80
  See application file for complete search history.

(56) References Cited

U.S. PATENT DOCUMENTS 9,232,378 B2 *   1/2016   Khosla ................... H04W 4/22
9,264,968 B2 *   2/2016   Tabet ..................... H04W 36/30
9,705,961 B2 *   7/2017   Wang ..................... H04L 67/06
(Continued)

FOREIGN PATENT DOCUMENTS

CN   102006563 A   4/2011
CN   103281431 A   9/2013
(Continued)

OTHER PUBLICATIONS

Communication dated Nov. 23, 2016, issued by the Chinese Patent Office in counterpart Chinese Patent Application No. 201410216465.0.
(Continued)

*Primary Examiner* — Chirag R Patel
(74) *Attorney, Agent, or Firm* — Sughrue Mion, PLLC

(57) ABSTRACT

A device for transmitting a file comprises a communication unit; an input unit configured to receive a user input for selecting a file to be transmitted to other device; and a controller configured to determine a distance between the device and the other device based on associated information of the other device, determine a transmission method based on the determined distance, and control the communication unit to transmit the file to the other device according to the determined transmission method.

16 Claims, 11 Drawing Sheets

(56) References Cited

U.S. PATENT DOCUMENTS

2004/0213212 A1* 10/2004 Reding ................ H04M 3/387
                                                    370/352
2010/0056137 A1    3/2010 Kamei
2013/0294363 A1   11/2013 Feng et al.
2014/0059231 A1    2/2014 Choi et al.

FOREIGN PATENT DOCUMENTS

| JP | 2013-235191 A | 11/2013 |
| JP | 2014-3379 A | 1/2014 |
| KR | 10-1232790 B1 | 3/2013 |
| KR | 10-2013-0118454 A | 10/2013 |

OTHER PUBLICATIONS

Communication dated Nov. 14, 2017, from the State Intellectual Property Office of People's Republic of China in counterpart Application No. 201410216465.0.
Communication dated Jun. 13, 2017, from the State Intellectual Property Office of People's Republic of China in counterpart Application No. 201410216465.0.

* cited by examiner

DEVICE FOR AND METHOD OF TRANSMITTING FILE

CROSS-REFERENCE TO RELATED APPLICATIONS

This application claims the benefit of State Intellectual Property Office (SIPO) of the People's Republic of China No. 201410216465.0, filed on May 21, 2014, in the State Intellectual Property Office (SIPO) of the People's Republic of China and Korean Patent Application No. 10-2015-0056895, filed on Apr. 22, 2015, in the Korean Intellectual Property Office, the disclosures of which are incorporated herein in their entireties by reference.

BACKGROUND

1. Field

One or more exemplary embodiments relate to mobile communications, and more particularly, to a device for and method of transmitting a file.

2. Description of the Related Art

The existing smart phones use various transmission methods for transmitting a file.

In an existing method for a smart phone transmitting the file, after a user selects the file to be transmitted, the smart phone will search for various transmission methods which can be used for transmitting the file to be transmitted, and present the various transmission methods to the user in a certain form, so that the user may select one from among the various transmission methods. Then, the user needs to select one method from among various transmission methods and performs a corresponding setting operation under the selected transmission method in order to transmit a desired file. However, in the above process, the operations that the user should perform are relatively complicated.

SUMMARY

One or more exemplary embodiments include a method and device for efficiently transmitting a file.

Additional aspects will be set forth in part in the description which follows and, in part, will be apparent from the description, or may be learned by practice of the presented exemplary embodiments.

According to one or more exemplary embodiments, a device for transmitting a file includes: a communication unit; an input unit configured to receive a user input for selecting a file to be transmitted to other device; and a controller configured to determine a distance between the device and the other device based on associated information of the other device, determine a transmission method based on the distance, and control the communication unit to transmit the file to the other device according to the determined transmission method.

The controller may determine the transmission method as a long distance communication transmission method or a short distance communication transmission method based on the determined distance.

The controller may acquire location information of the other device by transmitting a short message to a telephone number of the other device, acquire location information of the device, and determine the distance between the device and the other device according to the location information of the device and the location information of the other device, and the telephone number of the other device may be included in the associated information of the other device.

The controller may determine whether the device and the other device are located within a coverage of a same base station based on the associated information of the other device, determine the transmission method as a long distance communication transmission method when the device and the other device are not located within the coverage of the same base station, and determine the distance between the device and the other device and then the transmission method based on the determined distance when the device and the other device are located within the coverage of the same base station.

The controller may acquire base station information of the other device by transmitting an instruction for acquiring the base station information of the other device having a telephone number to a server of a base station and determine whether the device and the other device are located within the coverage of the same base station according to the base station information of the other device, and the telephone number of the other device may be included in the associated information of the other device.

The controller may determine the transmission method as the long distance communication transmission method when the distance between the device and the other device is greater than a preset distance, search for terminals which have turned on a short distance communication module of same type as a short distance communication module turned on in the device when the distance between the device and the other device is less than or equal to the preset distance, and determine the transmission method based on whether the found terminals comprise the other device.

The controller may determine that the found terminals comprise the other device when address information of the found terminals comprises address information of the other device and determine that the found terminals do not comprise the other device when the address information of the found terminals does not comprise the address information of the other device, and the address information of the other device may be included in the associated information of the other device.

The controller may determine the transmission method as the long distance communication transmission method when the found terminals do not comprise the other device, and determine the transmission method as a short distance communication transmission method when the found terminals comprise the other device and the other device is in an idle state and as the long distance communication transmission method when the found terminals comprise the other device and the other device is in a busy state.

When the controller determines the transmission method as a long distance communication transmission method, the controller may acquire a size of the file to be transmitted, determine the transmission method as a method of transmitting a file through a network application when the acquired size of the file to be transmitted is greater than or equal to a preset value, and determine the transmission method as a short message transmission method or a multimedia message transmission method when the acquired size of the file to be transmitted is less than the preset value, and account information of the network application associated with the other device and a telephone number of the other device may be included in the associated information of the other device.

When the acquired size of the file to be transmitted is less than the preset value, the controller may determine the transmission method as the short message transmission method or the multimedia message transmission method based on a format of the file to be transmitted.

According to one or more exemplary embodiments, a method of transmitting a file, which is executed on a device, includes: receiving a user input for selecting a file to be transmitted to other device; determining a distance between the device and the other device based on associated information of the other device and determining a transmission method based on the determined distance; and transmitting the file to the other device according to the determined transmission method.

The transmission method may be determined as a long distance communication transmission method or a short distance communication transmission method based on the determined distance.

The determining of the distance may include: acquiring location information of the other device by transmitting a short message for acquiring the location information of the other device to a telephone number of the other device; acquiring location information of the device; and determining the distance between the device and the other device according to the location information of the device and the location information of the other device, and the telephone number of the other device may be included in the associated information of the other device.

The determining of the transmission method may include: determining whether the device and the other device are located within a coverage of same base station based on the associated information of the other device; determining the transmission method as a long distance communication transmission method when the device and the other device are not located within the coverage of the same base station; and determining the distance between the device and the other device and then the transmission method based on the determined distance when the device and the other device are located within the coverage of the same base station.

The determining of the transmission method may further include acquiring base station information of the other device by transmitting an instruction for acquiring the base station information of the other device having a telephone number to a server of a base station and determining whether the device and the other device are located within the coverage of the same base station according to the base station information of the other device, and the telephone number of the other device may be included in the associated information of the other device.

The determining of the transmission method as the long distance communication transmission method or short distance communication transmission method based on the determined distance may include: determining the transmission method as the long distance communication transmission method if the determined distance between the device and the other device is greater than a preset distance; searching for terminals which have turned on a short distance communication module of same type as a short distance communication module turned on in the device when the distance between the device and the other device is less than or equal to the preset distance; and determining the transmission method based on whether the found terminals comprise the other device.

The determining of the transmission method based on whether the found terminals comprise the other device may include: determining the transmission method as the long distance communication transmission method when the found terminals do not comprise the other device; and determining the transmission method as a short distance communication transmission method when the found terminals comprise the other device and the other device is in an idle state and as the long distance communication transmission method when the found terminals comprise the other device and the other device is in a busy state.

The method may further include: acquiring a size of the file to be transmitted when the transmission method is determined as a long distance communication transmission method; determining the transmission method as a method of transmitting a file through a network application when the acquired size of the file to be transmitted is greater than or equal to a preset value; and determining the transmission method as a short message transmission method or a multimedia message transmission method when the acquired size of the file to be transmitted is less than the preset value, and account information of the network application associated with the other device and a telephone number of the other device may be included in the associated information of the other device.

The method may further include, when the acquired size of the file to be transmitted is less than the preset value, determining the transmission method as the short message transmission method or the multimedia message transmission method based on a format of the file to be transmitted.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
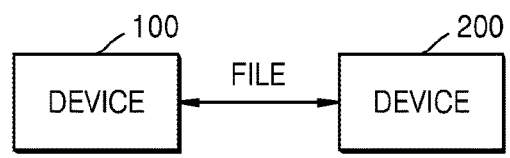
FIG. 1 illustrates devices according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

Hereinafter, the exemplary embodiments will be described in more detail with reference to the accompanying drawings.

FIG. 1 illustrates devices 100 and 200 according to an exemplary embodiment.

Referring to FIG. 1, each of the devices 100 and 200 may be an electronic device capable of transmitting or receiving a file. Examples of each of the devices 100 and 200 may include a mobile communication terminal, a mobile phone, a personal computer, a tablet computer, a game console, a digital multimedia player, a portable wearable device, etc. The device 100 may transmit or receive a file to or from the device 200. Furthermore, the device 200 may receive or transmit a file from or to the device 100.

In the specification, if the device 100 transmits a file to the device 200 and the device 200 receives the file, the device 100 may be referred to as a communication terminal, and the device 200 may also be referred to as a receiving device or receiving terminal.

A file that is transmitted to the device 200 by the device 100 may include various pieces of digital information. For example, the file may include, but is not limited to, moving images (e.g., TV program videos, video on demand (VOD), personal videos (user-created contents (UCC), music videos, youtube videos, etc.), still images (e.g., photos, pictures, etc.), texts (e.g., electronic books (poems and novels), letters, working documents), music content (e.g., music, instrumental music, radio broadcast content, etc.), web pages, application execution information, etc.

Figure 2:
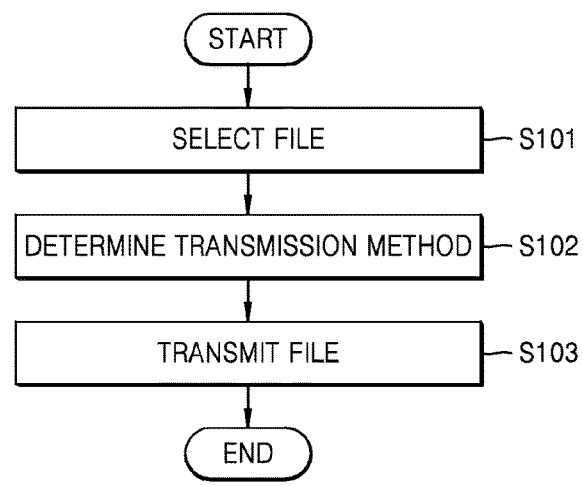
FIG. 2 is a flowchart of a method of transmitting a file according to an exemplary embodiment.

FIG. 2 is a flowchart of a method of transmitting a file in a communication terminal, according to an exemplary embodiment.

As an example, the communication terminal may be an electronic device which can transmit files, such as a mobile communication terminal, a personal computer, a tablet computer, a game console, a digital multimedia player, a portable wearable device etc.

In operation S101, the communication terminal receives a selection operation of a user for a file to be transmitted. In other words, the communication terminal may receive a user input for selecting a file to be transmitted.

In operation S102, the communication terminal determines a transmission method based on associated information of another communication terminal (hereinafter, also referred to as a receiving terminal) which receives the file to be transmitted.

Alternatively, the selection operation of the user for the file to be transmitted and a selection operation of a user for the receiving terminal which receives the file to be transmitted need to be received, before the transmission method is determined through operation S102.

In one example, the selection operation of the user for the receiving terminal which receives the file to be transmitted is received before operation S101 of receiving the selection operation of the user for the file to be transmitted is performed, and then operation S101 is performed.

In another example, the selection operation of a user for the receiving terminal which receives the file to be transmitted is received after operation S101 of receiving the selection operation of the user for selecting the file to be transmitted is performed, and then operation S102 is performed.

Alternatively, associated information of the receiving terminal which receives the file to be transmitted may include at least one of a telephone number of the receiving terminal, address information of the receiving terminal (e.g., an media access control (MAC) address of the receiving terminal), account information of a network application associated with the receiving terminal (e.g., Email account information, QQ account information, Wechat account information etc.).

For example, the communication terminal may need to first acquire associated information of the receiving terminal and then determine a transmission method based on the associated information of the receiving terminal when the communication terminal transmits the file to the receiving terminal.

Various transmission methods may be used such as a long distance communication transmission method and a short distance communication transmission method. For example, the long distance communication transmission method may include a method of transmitting a file through a network application, a short message transmission method (e.g., short message service (SMS)), and a multimedia message transmission method (e.g., multimedia message service (MMS)). Alternatively, the method of transmitting a file through a network application may be a method other than the short message transmission method and the multimedia message transmission method. Examples of the network application may include, but are not limited to, a QQ account, an E-surfing cloud account, an email account, etc. In one example, the method of transmitting a file through a network application may be an Email transmission method, a QQ transmission method, and a Wechat transmission method.

In one example, the short distance communication transmission method may include a Bluetooth transmission method, a Wi-Fi Direct (WFD) transmission method, and a Near Field Communication (NFC) transmission method.

In operation S103, the communication terminal transmits the file according to the determined transmission method.

After determining the transmission method in operation S102, the file is transmitted according to the determined transmission method in operation S103.

Figure 3:
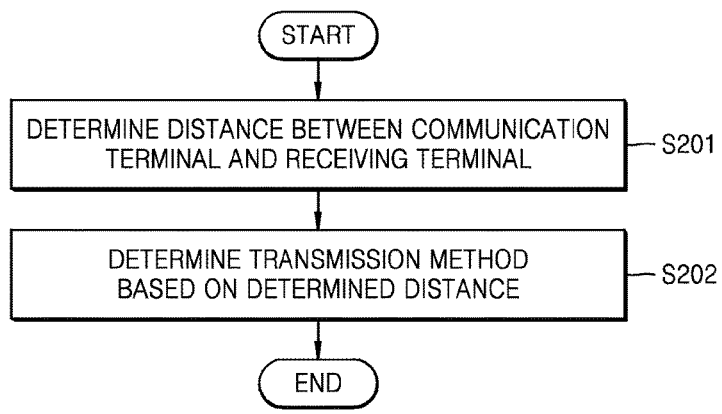
FIG. 3 is a flowchart of a method of determining a transmission method in a communication terminal, according to an exemplary embodiment.

FIG. 3 is a flowchart of a method of determining a transmission method in a communication terminal, according to an exemplary embodiment.

In operation S201, the communication terminal may determine a distance between the communication terminal and a receiving terminal that receives a file to be transmitted based on associated information of the receiving terminal.

In operation S202, the communication terminal may determine a transmission method based on the distance between the communication terminal and the receiving terminal. The communication terminal may compare the distance between the communication terminal and the receiving terminal with a preset distance. If the distance between the communication terminal and the receiving terminal is greater than the preset distance, the communication terminal may determine the transmission method as a long distance communication transmission method. On the other hand, if the distance between the communication terminal and the receiving terminal is less than or equal to the preset distance, the communication terminal may determine the transmission method as a short distance communication transmission method.

Alternatively, a value of the preset distance may be determined according to a distance requirement for the existing short distance communication transmission method.

Figure 4:
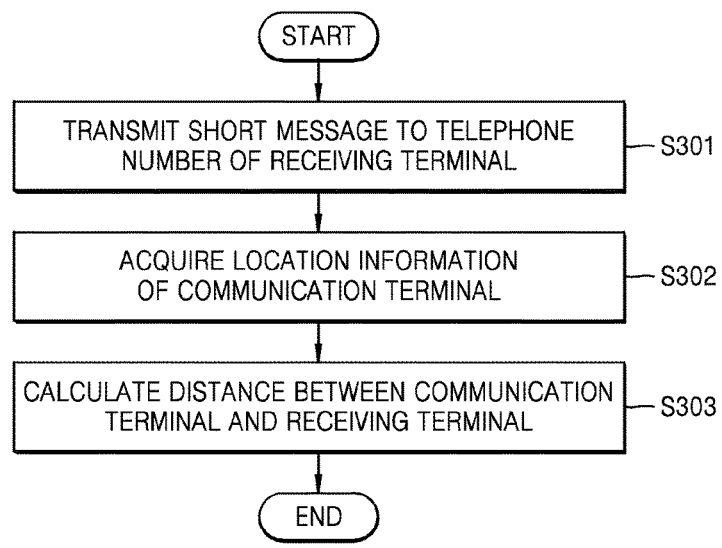
FIG. 4 is a flowchart of a method of determining a distance between a communication terminal and a receiving terminal in the communication terminal, according to an exemplary embodiment.

FIG. 4 is a flowchart of a method of determining a distance between a communication terminal and a receiving terminal in the communication terminal, according to an exemplary embodiment.

The determining of the distance, which is performed by the communication terminal, between the communication terminal and the receiving terminal, which receives the file to be transmitted based on the associated information of the receiving terminal, may include: transmitting a short message for acquiring location information of the receiving terminal to a telephone number of the receiving terminal, so as to acquire the location information of the receiving terminal (S301); acquiring location information of the communication terminal (S302); and calculating the distance between the communication terminal and the receiving terminal according to the location information of the communication terminal and the location information of the receiving terminal (S303). After determining the distance between the communication terminal and the receiving terminal, the communication terminal may determine a transmission method based on the distance therebetween. In this case, the telephone number of the receiving terminal is contained in the associated information of the receiving terminal. Here, the location information of the receiving terminal may be latitude and longitude location information of the receiving terminal, the location information of the communication terminal may be latitude and longitude location information of the communication terminal. Alternatively, the location information of the communication terminal may be acquired by using a satellite positioning system, for example, the location information of the communication terminal may be acquired by using a Global Positioning System (GPS).

For example, a short message which contains an instruction for acquiring the location information of the receiving terminal may be transmitted to the telephone number of the receiving terminal via a telephone number of the communication terminal, and a replied short message which includes the latitude and longitude location information of the receiving terminal may be received from the receiving terminal. Then, the communication terminal may acquire the latitude and longitude location information of the communication terminal by using the GPS. The distance between the receiving terminal and the communication terminal may be calculated according to the latitude and longitude location information of the receiving terminal and the latitude and longitude location information of the communication terminal. In this case, the telephone number of the communication terminal is contained in the associated information of the communication terminal, and the associated information of the communication terminal is stored in the communication terminal.

Alternatively, the associated information of the communication terminal may include visible associated information and private associated information. The visible associated information may include at least one of a telephone number of the communication terminal, address information of the communication terminal (e.g., an MAC address of the communication terminal), account information of a network application associated with the communication terminal (e.g., Email account information, QQ account information, Wechat account information, etc.). Alternatively, the private associated information may include at least one of an account password of the network application associated with the communication terminal (e.g., an Email account password, a QQ account password, a Wechat account password etc.). For example, when the communication terminal and the receiving terminal exchange the associated information, the communication terminal may provide the visible associated information of the communication terminal to the receiving terminal, but does not provide the private information of the communication terminal to the receiving terminal.

Alternatively, before the distance between the communication terminal and the receiving terminal is determined, it may be determined whether the communication terminal and the receiving terminal are located within a coverage of the same base station based on the associated information of the receiving terminal which receives the file to be transmitted.

Figure 5:
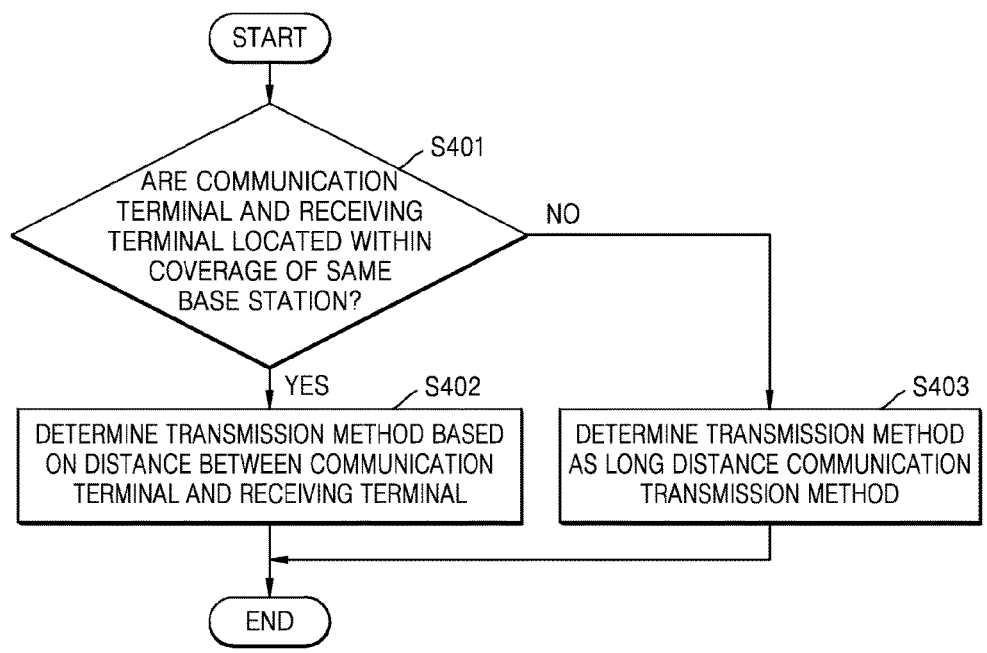
FIG. 5 is a flowchart of a method of determining a transmission method in a communication terminal, according to another exemplary embodiment.

FIG. 5 is a flowchart of a method of determining a transmission method in a communication terminal, according to another exemplary embodiment Referring to FIG. 5, the communication terminal may determine whether the communication terminal and a receiving terminal are located within a coverage of the same base station based on associated information of the receiving terminal (S401).

If the communication terminal and the receiving terminal are located within a coverage of the same base station, the communication terminal may determine a transmission method based on a distance between the communication terminal and the receiving terminal (S402). For example, the communication terminal may determine the distance between the communication terminal and the receiving terminal, as described above with reference to FIG. 4. If the distance between the communication terminal and the receiving terminal is greater than a preset distance, the communication terminal may determine a transmission method as a long distance communication transmission method. If the distance between the communication terminal and the receiving terminal is less than or equal to the preset distance, the communication terminal may determine the transmission method as a short distance communication transmission method.

On the other hand, if the communication terminal and the receiving terminal are not located within the coverage of the same base station, the communication terminal may determine the transmission method as a long distance communication transmission method (S403).

When the communication terminal and the receiving terminal are located within the coverage of the same base station, it is generally deemed that, the communication terminal and the receiving terminal are likely to satisfy a distance requirement for a short distance communication transmission method, and in this case, it is determined whether the distance between the communication terminal and the receiving terminal satisfies the distance requirement for the short distance communication transmission method.

When the communication terminal and the receiving terminal are not located within the coverage of the same base station, it is considered that the communication terminal and the receiving terminal do not satisfy the distance requirement for the short distance communication method. Thus, in this case, the distance between the communication terminal and the receiving terminal does not need to be determined and the transmission method may be directly determined as a long distance communication transmission method.

Figure 6:
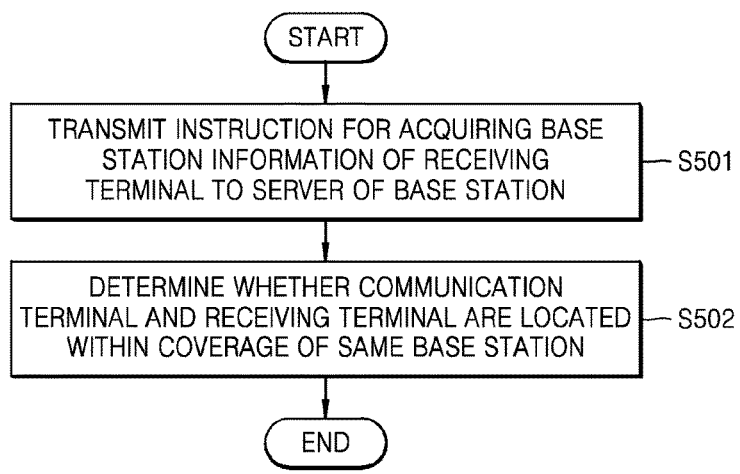
FIG. 6 is a flowchart of a method of determining, in a communication terminal, whether the communication terminal and a receiving terminal are located within a coverage of the same base station, according to an exemplary embodiment.

FIG. 6 is a flowchart of a method of determining, in a communication terminal, whether the communication terminal and a receiving terminal are located within a coverage of the same base station, according to an exemplary embodiment.

Alternatively, the operation (e.g., S401 of FIG. 5) of determining whether the communication terminal and the receiving terminal are located within the coverage of the same base station based on associated information of the receiving terminal which receives a file to be transmitted, which is performed by the communication terminal, may include: transmitting an instruction for acquiring base station information of the receiving terminal having the telephone number to a server of the base station, so as to acquire the base station information of the receiving terminal (S501); and determining whether the communication terminal and the receiving terminal are located within the coverage of the same base station according to the base station information of the receiving terminal (S502).

If the communication terminal and the receiving terminal are not located within the coverage of the base station, the communication terminal may determine a transmission method as a long distance communication transmission method. On the other hand, if the communication terminal and the receiving terminal are located within the coverage of the base station, the communication terminal may determine the distance between the communication terminal and the receiving terminal. The communication terminal may determine a transmission method based on the distance between the communication terminal and the receiving terminal. For example, if the distance between the communication terminal and the receiving terminal is greater than a preset distance, the transmission method may be determined as a long distance communication transmission method. The transmission method may be determined as a short distance communication transmission method when the distance between the communication terminal and the receiving terminal is less than or equal to the preset distance. Alternatively, a value of the preset distance may be determined according to a distance requirement for the existing short distance communication transmission method.

Figure 7:
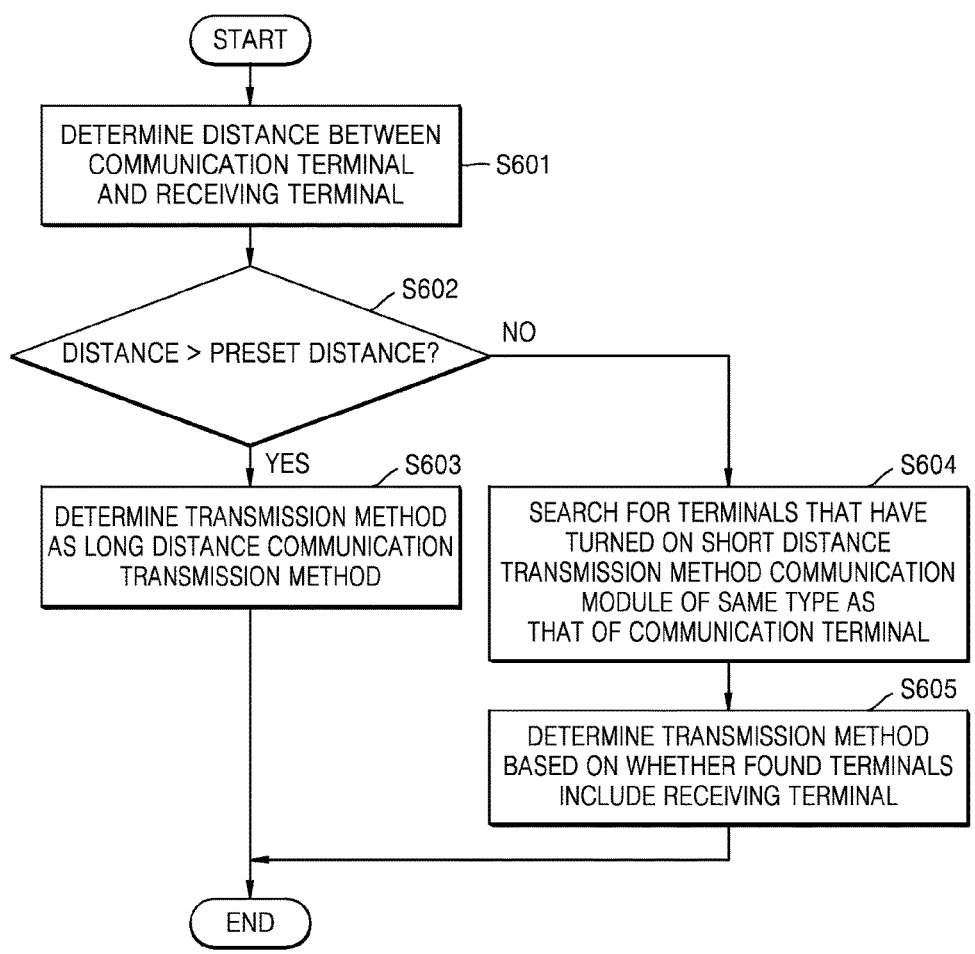
FIG. 7 is a flowchart of a method of determining a transmission method in a communication terminal, according to another exemplary embodiment.

FIG. 7 is a flowchart of a method of determining a transmission method in a communication terminal, according to another exemplary embodiment.

Referring to FIG. 7, the communication terminal may determine a distance between the communication terminal and a receiving terminal based on associated information of the receiving terminal (S601). As described with reference to FIG. 5, the communication terminal may first determine whether the communication terminal and the receiving terminal are located within a coverage of the same base station before determining the distance therebetween. When the communication terminal and the receiving terminal are not located within the coverage of the base station, the communication terminal may determine a transmission method as a long distance communication transmission method. When the communication terminal and the receiving terminal are located within the coverage of the same base station, operation S601 is performed to determine the distance between the communication terminal and the receiving terminal.

The communication terminal may compare the distance between the communication terminal and the receiving terminal against a preset distance (S602).

When the distance between the communication terminal and the receiving terminal is greater than the preset distance, the communication terminal may determine a transmission method as a long distance communication transmission method (S603).

When the distance between the communication terminal and the receiving terminal is less than or equal to the preset distance, the communication terminal may search for terminals which have turned on a short distance communication module of the same type as a short distance communication module currently turned on in the communication terminal (S604).

The communication terminal may detect whether the found terminals include the receiving terminal based on associated information of the receiving terminal which receives a file to be transmitted. The communication terminal may determine the transmission method based on whether the found terminals include the receiving terminal (S605). If the found terminals include the receiving terminal, the communication terminal may determine the transmission method as a short distance communication transmission method. Otherwise, if the found terminals do not include the receiving terminal, the communication terminal may determine the transmission method as the long distance communication transmission method.

Alternatively, when a plurality of short distance communication modules are included in the communication terminal, the communication terminal turns on the short distance communication modules when the distance between the communication terminal and the receiving terminal is less than or equal to the preset distance, and then searches for terminals which have turned on a short distance communication module of same type as the short distance communication module currently turned on in the communication terminal. In this case, if the found terminals do not include the receiving terminal, the transmission method is determined as the long distance communication transmission method If address information of the found terminals includes address information of the receiving terminal contained in the associated information of the receiving terminal, the communication terminal may determine that the found terminals include the receiving terminal. If the address information of the found terminals does not include the address information of the receiving terminal, the communication terminal may determine that the found terminals do not include the receiving terminal.

For example, the operation of detecting whether the found terminals include the receiving terminal based on the associated information of the receiving terminal which receives the file to be transmitted may include: detecting whether the address information of the found terminals includes the address information of the receiving terminal; determining the transmission method as the short distance communication transmission method when the address information of the found terminals includes the address information of the receiving terminal; and determining the transmission method as the long distance communication transmission method when the address information of the found terminals does not include the address information of the receiving terminal. In this case, the address information of the receiving terminal is included in the associated information of the receiving terminal.

Hereinafter, taking the address information of the receiving terminal being MAC address information of the receiving terminal as an example, specific operations of determining the transmission method in a case where the distance between the communication terminal and the receiving terminal is less than or equal to the preset distance are described. For example, the communication terminal may turn on its short distance communication module, and then searches for the terminals which have turned on a short distance communication module of the same type as the short distance communication module currently turned on in the communication terminal; acquires an MAC address information list of the found terminals; detects whether the MAC address information list of the found terminals includes the MAC address information of the receiving terminal; determines the transmission method as the short distance communication transmission method when the MAC address information list of the found terminals includes the MAC address information of the receiving terminal; and determines the transmission method as the long distance communication transmission method when the MAC address information list of the found terminals does not include the MAC address information of the receiving terminal.

Figure 8:
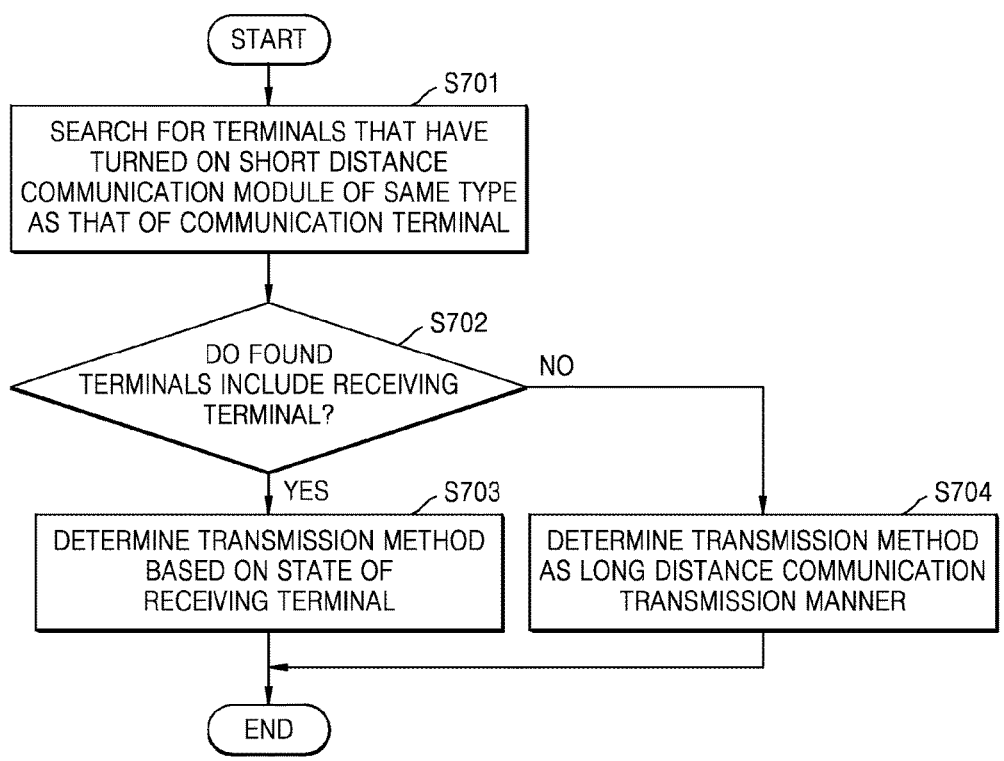
FIG. 8 is a flowchart of a method of determining a transmission method in a communication terminal, according to another exemplary embodiment.

FIG. 8 is a flowchart of a method of determining a transmission method in a communication terminal, according to another exemplary embodiment.

Referring to FIG. 8, the communication terminal may search for terminals that have turned on a short distance communication module of the same type as a short distance communication terminal currently turned on in the communication terminal (S701).

The communication terminal may detect whether the found terminals include the receiving terminal (S702). In one example, the communication terminal may determine whether the found terminals include the receiving terminal based on whether address information of the found terminals includes address information of the receiving terminal. The address information of the receiving terminal may be included in associated information of the receiving terminal. If the address information of the found terminals includes the address information of the receiving terminal, the communication terminal may determine that the found terminals include the receiving terminal.

If the found terminals include the receiving terminal, the communication terminal may determine a transmission method based on a state of the receiving terminal (S703). For example, the receiving terminal may be in an idle or busy state. The communication terminal may determine whether the state of the receiving terminal is idle. If the state of the receiving terminal is idle, the communication terminal may determine a transmission method as a short distance communication transmission method. On the other hand, if the state of the receiving terminal is busy, the communication terminal may determine the transmission method as a long distance communication transmission method.

When the found terminals do not include the receiving terminal, the communication terminal may determine the transmission method as a long distance communication transmission method (S704).

In one example, the short distance communication transmission method may include a Bluetooth transmission method, a WFD transmission method, and an NFC transmission method. For example, priorities of short distance communication transmission methods may be preset (e.g., the WFD transmission method is prior to the Bluetooth transmission method which is prior to the NFC transmission method), and the user may amend an order of the priorities of the short distance communication transmission methods manually. When the communication terminal turns on a short distance communication module to search for terminals, the short distance communication transmission methods may be turned on one by one according to the preset priority thereof, in which the short distance communication transmission method which satisfies a requirement will be used.

Alternatively, the long distance communication transmission method may include a transmission method of transmitting a file by using a network application, a short message transmission method, and a multimedia message transmission method.

If the transmission method is determined as the long distance communication transmission method, the communication terminal may determine the type of the long distance communication transmission method based on at least one of a size and a format of a file to be transmitted to the receiving terminal.

Figure 9:
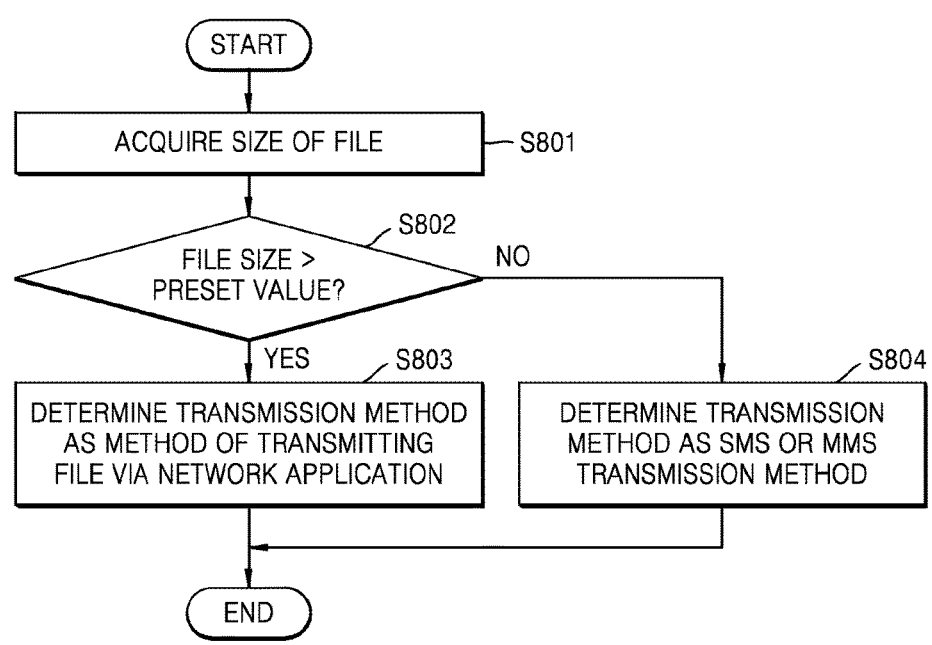
FIG. 9 is a flowchart of a method of determining the type of a long distance communication transmission method if a communication terminal determines a transmission method as a long distance communication transmission method.

FIG. 9 is a flowchart of a method of determining the type of a long distance communication transmission method if a communication terminal determines a transmission method as a long distance communication transmission method. For example, if a communication terminal and a receiving terminal are not located within a coverage of the same base station, if a distance between the communication terminal and the receiving terminal is greater than a preset distance, if the communication terminal searches for terminals which have turned on a short distance communication module of the same type as a short distance communication module of the communication terminal and the found terminals do not include the receiving terminal, or if the receiving terminal is in a busy state, the communication terminal may determine the transmission method as a long distance communication transmission method.

Alternatively, the determining of the transmission method as the long distance communication transmission method may include: acquiring a size of a file to be transmitted (S801); comparing the acquired size of the file to be transmitted with a preset value (S802); determining the transmission method as a transmission method of transmitting a file through a network application when the acquired size of the file to be transmitted is larger than or equal to the preset value (S803); and determining the transmission method as a short message or multimedia message transmission method when the acquired size of the file to be transmitted is smaller than the preset value (S804). The communication terminal may determine the transmission method as the short message or multimedia message transmission method based on the format of the file.

Alternatively, the transmission method of transmitting the file through the network application may be other transmission methods except for the short message and multimedia message transmission methods, and in this case, account information of the network application associated with the receiving terminal is included in the associated information of the receiving terminal.

In one example, the transmission method of transmitting the file through the network application may include an Email transmission method, a QQ transmission method, and a Wechat transmission method. For example, priorities of the above three transmission methods of transmitting the file through the network application may be preset (e.g., the Email transmission method is prior to the QQ transmission method which is prior to the Wechat transmission method), and the user may amend an order of the priorities of the three communication transmission methods of transmitting the file through the network application manually.

The operation of determining the transmission method as the short message or multimedia message transmission method may include: acquiring a format of the file to be transmitted when the acquired size of the file to be transmitted is smaller than the preset value; determining the transmission method as the short message transmission method when the format of the file to be transmitted is a first preset format (e.g., txt); and determining the transmission method as the multimedia message transmission method (e.g., MMS) when the format of the file to be transmitted is a second preset format (e.g., JPG, GIF, BMP, etc.).

In this way, the file is transmitted according to the determined transmission method.

After determining the transmission method, the communication terminal transmits the file according to the determined transmission method.

Hereinafter, taking that the transmission method of transmitting the file through the network application is an Email transmission method as an example, specific operations of transmitting the file according to the determined transmission method are described. For example, when the acquired size of the file to be transmitted is larger than or equal to the preset value, the communication terminal first acquires Email account information and an Email account password in associated information of the communication terminal, and then acquires Email account information in the associated information of the receiving terminal, at last transmits the file to be transmitted to the Email account in the associated information of the receiving terminal by using the Email account in the associated information of the communication terminal. After receiving the file, the receiving terminal will store the received file, and will automatically record storage path of the file, so that the user may find the received file only by viewing receiving records of the receiving terminal.

Figure 10:
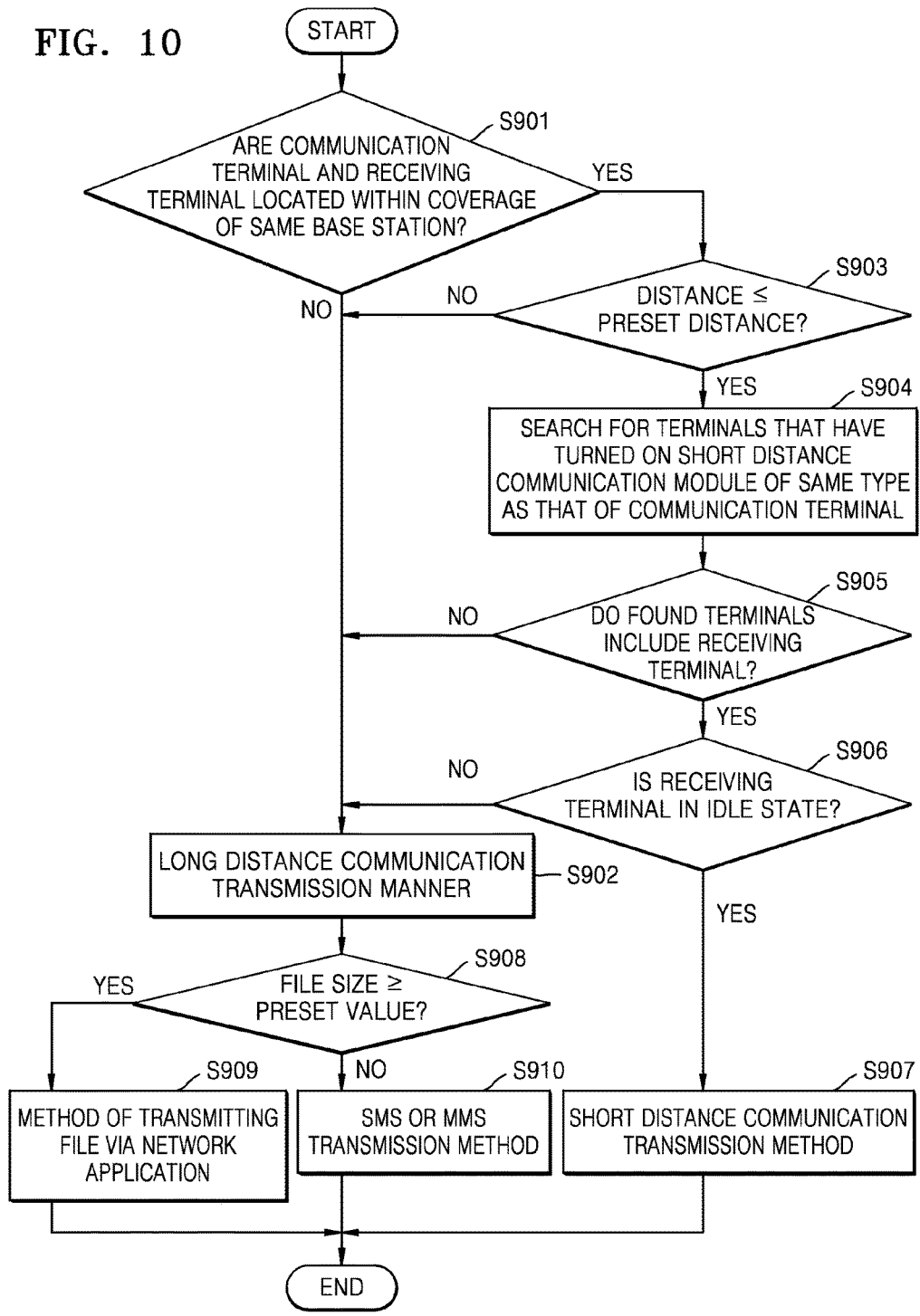
FIG. 10 is a flowchart of a method of determining a transmission method in a communication terminal, according to another exemplary embodiment.

FIG. 10 is a flowchart of a method of determining a transmission method in a communication terminal, according to another exemplary embodiment.

Referring to FIG. 10, the communication terminal may determine whether the communication terminal and a receiving terminal are located within a coverage of the same base station based on associated information of the receiving terminal (S901).

If the communication terminal and the receiving terminal are not located within the coverage of the same base station, the communication terminal may determine a transmission method as a long distance communication transmission method (S902).

On the other hand, if the communication terminal and the receiving terminal are located within the coverage of the same base station, the communication terminal may determine the transmission method based on a distance between the communication terminal and the receiving terminal. The communication terminal may determine the distance to the receiving terminal. The communication terminal may compare the distance between the communication terminal and the receiving terminal against a preset distance (S903).

If the distance between the communication terminal and the receiving terminal is greater than the preset distance, the communication terminal may determine the transmission method as a long distance communication transmission method (S902). On the other hand, if the distance between the communication terminal and the receiving terminal is less than or equal to the preset distance, the communication terminal may search for terminals which have turned on a short distance communication module of the same type as a short distance communication module currently turned on in the communication terminal (S904).

The communication terminal may detect whether the found terminals include the receiving terminal, based on the associated information of the receiving terminal (S905). In one example, the communication terminal may detect whether the found terminals include the receiving terminal, according to whether address information of the found terminals includes address information of the receiving terminal.

If the found terminals do not include the receiving terminal, the communication terminal may determine the transmission method as a long distance communication transmission method (S902). Otherwise, if the found terminals include the receiving terminal, the communication terminal may detect whether a state of the communication terminal is idle (S906). If the state of the receiving terminal is idle, the communication terminal may determine the transmission method as a short distance communication transmission method (S907). If the state of the receiving terminal is not idle (e.g., busy), the communication terminal may determine the transmission method as a long distance communication transmission method (S902).

If the communication determines the transmission method as the long distance communication transmission method (S902), the communication terminal may acquire a size of a file to be transmitted and compare the size of the file to be transmitted with a preset value (S908).

If the acquired size of the file to be transmitted is greater than or equal to the preset value, the communication terminal may determine the transmission method as a method of transmitting a file through a network application (S909).

On the other hand, if the acquired size of the file to be transmitted is less than the preset value, the communication terminal may determine the transmission method as a short message or multimedia message transmission method (S910). The communication terminal may determine the transmission method as a short message or multimedia message transmission method based on a format of the file to be transmitted.

Figure 11:
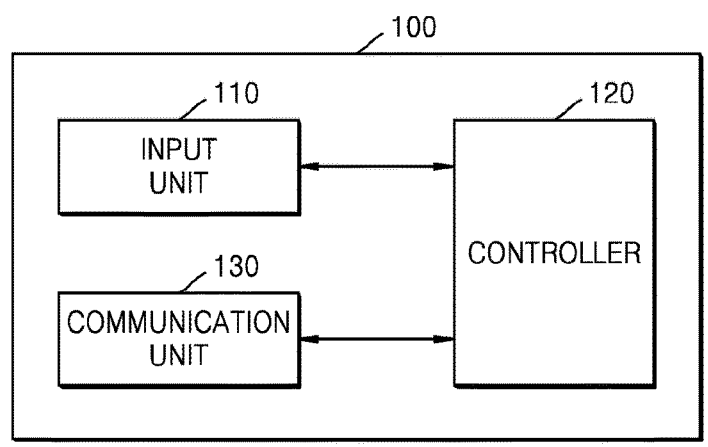
FIG. 11 is a block diagram of a structure of a device for transmitting a file according to an exemplary embodiment.

FIG. 11 is a block diagram of a structure of a device 100 for transmitting a file according to an exemplary embodiment. The device 100 of FIG. 11 may be one or more exemplary embodiments of the device 100 of FIG. 1, may be a communication terminal shown in FIGS. 2 through 10 or include the communication terminal.

Referring to FIG. 11, the device 100 for transmitting a file according to one or more exemplary embodiments includes an input unit 110, a controller 120, and a communication unit 130. However, all of the components shown in FIG. 11 are not essential components of the device 100. The device 100 may include more or fewer components than those shown in FIG. 11.

The input unit 110 is a unit via which a user inputs data for controlling the device 100. For example, the input unit 110 may include a keypad, a dome switch, a touchpad (a capacitive overlay type, a resistive overlay type, an infrared beam type, a surface acoustic wave type, an integral strain gauge type, a piezoelectric type, etc.), a jog wheel, a jog switch, etc., but exemplary embodiments are not limited thereto.

The controller 120 may control overall operations of the device 100. The controller may also process various data necessary for operations of the device 100. The controller 120 may control an operation of the communication terminal described above with reference to FIGS. 2 through 10 and process data needed for the operation. The controller 120 may include a central processing unit (CPU), a microprocessor, a graphic processing unit (GPU), etc. For example, the controller 120 may control overall operations of the input unit 110 and the communication unit 130 by executing programs stored in a memory (not shown).

The communication unit 130 may include at least one component that enables the device 100 to communicate with another device such as a receiving terminal. For example, the communication unit 130 may include a short distance communication module and a long distance communication module.

The short distance communication module is a module for performing short distance communication with another device that is located within a predetermined distance from the device 100. According to an exemplary embodiment, examples of a short distance communication technology may include a Wireless LAN, Wi-Fi, Bluetooth, ZigBee, WFD, ultra wideband (UWB), Infrared Data Association (IrDA), Bluetooth Low Energy (BLE), NFC, etc., but exemplary embodiments are not limited thereto.

The long distance communication module is a module for performing communication with another device by using a long distance communication module. According to an exemplary embodiment, examples of a long distance communication technology may include a method of transmitting a file via a network application, a short message transmission method, and a multimedia message transmission method. Alternatively, the method of transmitting a file via the network application may be transmission methods other than the short message and multimedia message transmission methods. In one example, the transmission method of transmitting a file via the network application may include an Email transmission method, a QQ transmission method, and a Wechat transmission method.

The input unit 110 receives a selection operation of a user for a file to be transmitted.

The controller 120 determines a transmission method based on associated information of another communication terminal (hereinafter, referred to as a receiving terminal, a receiving device, or a second device) which receives the file to be transmitted.

Alternatively, the input unit 110 needs to receive the selection operation of the user for the file to be transmitted and receive a selection operation of the user for the receiving terminal which receives the file to be transmitted before the controller 120 determines the transmission method.

In one example, the input unit 110 may receive the selection operation of the user for the receiving terminal which receives the file to be transmitted before receiving the selection operation of the user for the file to be transmitted, and then the input unit 110 receives the selection operation of the user for the file to be transmitted.

In another example, the input unit 110 may receive the selection operation of the user for the receiving terminal which receives the file to be transmitted after receiving the selection operation of the user for the file to be transmitted, and then the controller 120 determines the transmission method.

Alternatively, the associated information of the receiving terminal which receives the file to be transmitted may include at least one of a telephone number of the receiving terminal, address information of the receiving terminal (e.g., an MAC address of the receiving terminal), and account information of a network application associated with the receiving terminal (e.g., Email account information, QQ account information, Wechat account information, etc.).

For example, the controller 120 needs to first acquire the associated information of the receiving terminal, and then determine the transmission method based on the associated information of the receiving terminal which receives the file to be transmitted when the communication terminal transmits the file to the receiving terminal.

Alternatively, the controller 120 may include a distance determination unit and a transmission method determination unit.

The distance determination unit determines a distance between the communication terminal and the receiving terminal based on the associated information of the receiving terminal which receives the file to be transmitted.

For example, the distance determination unit may include a first acquisition unit, a second acquisition unit and a calculation unit. The first acquisition unit transmits a short message for acquiring location information of the receiving terminal to the telephone number of the receiving terminal, so as to acquire the location information of the receiving terminal; the second acquisition unit acquires location information of the communication terminal; and the calculation unit calculates the distance between the communication terminal and the receiving terminal according to the location information of the communication terminal and the location information of the receiving terminal. In this case, the telephone number of the receiving terminal is included in the associated information of the receiving terminal. Here, the location information of the receiving terminal may be latitude and longitude location information of the receiving terminal, the location information of the communication terminal may be latitude and longitude location information of the communication terminal. Alternatively, the second acquisition unit may be a satellite positioning system. For example, the second acquisition unit may be a GPS.

For example, the first acquisition unit may transmit a short message which includes an instruction for acquiring the location information of the receiving terminal to the telephone number of the receiving terminal via a telephone number of the communication terminal, then receives a replied short message which includes the latitude and longitude location information of the receiving terminal from the receiving terminal, then the second acquisition unit acquires the latitude and longitude location information of the communication terminal, and the calculation unit may calculate the distance between the receiving terminal and the communication terminal according to the latitude and longitude location information of the receiving terminal and the latitude and longitude location information of the communication terminal. In this case, the telephone number of the communication terminal is included in associated information of the communication terminal, and the associated information of the communication terminal is stored in the communication terminal.

Alternatively, the associated information of the communication terminal includes visible associated information and private associated information. The visible associated information may include at least one of a telephone number of the communication terminal, address information of the communication terminal (e.g., an MAC address of the communication terminal), account information of a network application associated with the communication terminal (e.g., Email account information, QQ account information, Wechat account information, etc.). Alternatively, the private associated information may include at least one of an account password of the network application associated with the communication terminal (e.g., an Email account password, a QQ account password, a Wechat account password, etc.). For example, when the communication terminal and the receiving terminal exchange the associated information, the communication terminal may provide the visible associated information to the receiving terminal, but does not provide the private information to the receiving terminal.

Alternatively, the distance determination unit may first judge whether the communication terminal and the receiving terminal are located within a coverage of a same base station based on the associated information of the receiving terminal which receives the file to be transmitted before determining the distance between the communication terminal and the receiving terminal. When the communication terminal and the receiving terminal are located within the coverage of the same base station, it is generally deemed that, the communication terminal and the receiving terminal are likely to satisfy a distance requirement for a short distance communication transmission method, and in this case, the distance determination unit determines the distance between the communication terminal and the receiving terminal.

When the communication terminal and the receiving terminal are not located within the coverage of the same base station, it is considered that the communication terminal and the receiving terminal do not satisfy the distance requirement for the short distance communication method. Thus, in this case, the distance between the communication terminal and the receiving terminal does not need to be determined, and the transmission method determination unit may directly determine the transmission method as a long distance communication transmission method.

Alternatively, the distance determination unit may transmit an instruction for acquiring base station information of the receiving terminal having a telephone number to a server of the base station, so as to acquire the base station information of the receiving terminal, and determines whether the communication terminal and the receiving terminal are located within the coverage of the same base station according to the base station information of the receiving terminal.

Alternatively, the transmission method determination unit may determine the transmission method as the short distance communication transmission method when the distance between the communication terminal and the receiving terminal is smaller than or equal to a preset distance. Alternatively, a value of the preset distance may be determined according to a requirement for the existing short distance communication transmission method.

Alternatively, the transmission method determination unit may first search for terminals which have turned on a short distance communication module of the same type as a short distance communication module currently turned on in the communication terminal when the distance between the communication terminal and the receiving terminal is smaller than or equal to the preset distance, then detects whether the found terminals include the receiving terminal based on the associated information of the receiving terminal which receives the file to be transmitted, determines the transmission method as the short distance communication transmission method when the found terminals include the receiving terminal, and determines the transmission method as the long distance communication transmission method when the found terminals do not include the receiving terminal.

For example, the transmission method determination unit detects whether address information of the found terminals includes address information of the receiving terminal, determines the transmission method as the short distance communication transmission method when the address information of the found terminals includes the address information of the receiving terminal, and determines the transmission method as the long distance communication transmission method when the address information of the found terminals does not include the address information of the receiving terminal. In this case, the address information of the receiving terminal is included in the associated information of the receiving terminal.

Alternatively, when the address information of the found terminals includes the address information of the receiving terminal, the transmission method determination unit may detect whether a state of the receiving terminal is idle, and the transmission method determination unit determines the transmission method as the short distance communication transmission method when the state of the receiving terminal is idle, and determines the transmission method as the long distance communication transmission method when the state of the receiving terminal is busy.

Alternatively, the transmission method determination unit determines the transmission method as the long distance communication transmission method when the distance between the communication terminal and the receiving terminal is larger than the preset distance. For example, the long distance communication transmission method may include a transmission method of transmitting a file through a network application, a short message transmission method, and a multimedia message transmission method.

Alternatively, the transmission method determination unit acquires a size of the file to be transmitted, compares the acquired size of the file to be transmitted with a preset value, determines the transmission method as the transmission method of transmitting the file through the network application when the acquired size of the file to be transmitted is larger than or equal to the preset value, and determines the transmission method as the short message or the multimedia message transmission methods when the acquired size of the file to be transmitted is smaller than the preset value. Alternatively, the transmission method of transmitting the file through the network application may be other transmission methods except for the short message and the multimedia message transmission methods, in this case, the account information of the network application associated with the receiving terminal is included in the associated information of the receiving terminal.

Alternatively, the transmission method determination unit acquires a format of the file to be transmitted when the acquired size of the file to be transmitted is smaller than the preset value, determines the transmission method as the short message transmission method when the format of the file to be transmitted is a first preset format, and determines the transmission method as the multimedia message transmission method (e.g., MMS) when the format of the file to be transmitted is a second preset format.

Since functions of the transmission method determination unit have been described in details with reference to the above figures, a repeated description thereof is omitted here.

The controller 120 controls the communication unit 130 to transmit the file according to the determined transmission method.

After determining the transmission method, the controller 120 may transmit the file according to the determined transmission method.

Since functions of the controller 120 which transmits the file according to the determined transmission method have been described in details with reference to the above figures, a repeated description thereof is omitted.

According to the method and the device of the present inventive concept, the user may intuitively select the receiving terminal which receives the file to be transmitted when transmitting the file, and after the receiving terminal which receives the file to be transmitted is selected, the device can automatically determine the transmission method of the file to be transmitted according to a certain determination condition. In this case, the user does not need to select the transmission method manually, thereby improving user experience.

According to the method and the device of the present inventive concept, a receiving terminal for receiving a file to be transmitted may be selected, and the device may automatically determine a transmission method of the file to be transmitted according to a certain determination condition, thereby improving user convenience.

Furthermore, it should be understood that, each unit in the device for transmitting the file in the communication terminal in accordance with the exemplary embodiment can be implemented in hardware components. According to processes executed by each defined unit, those skilled in the art may use a field-programmable gate array (FPGA) or an application-specific integrated circuit (ASIC) to implement each unit.

In addition, the method for transmitting the file in the communication terminal in accordance with the exemplary embodiment may be implemented as a computer code of a computer readable recording medium. Those skilled in the art may implement the computer code according to the description of the above method. The above method of the present inventive concept is implemented when the computer code is executed in the computer.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A device for transmitting a file, the device being a first device and comprising:
    a communication unit;
    an input unit configured to obtain a user input for selecting a file to be transmitted to a second device; and
    at least one processor configured to:
    identify a transmission method as a long distance communication transmission method or a short distance communication transmission method based on a distance between the first device and the second device, and control the communication unit to transmit the file to the second device according to the identified transmission method,
    identify the transmission method as the long distance communication transmission method when the distance between the first device and the second device is greater than a predetermined distance,
    search for terminals which have turned on a short distance communication module of same type as a short distance communication module currently turned on in the first device when the distance between the first device and the second device is less than or equal to the predetermined distance,
    identify the transmission method as one of the short distance communication transmission method and the long distance communication transmission method based on a state of the second device in response to identifying that the searched terminals comprise the second device, and
    identify the transmission method as the long distance communication transmission method in response to identifying that the searched terminals do not comprise the second device,
    wherein the state of the second device comprises an idle state and a busy state.

2. The device of claim 1, wherein the at least one processor is further configured to acquire location information of the second device by transmitting a short message to a telephone number of the second device, acquire location information of the first device, and identify the distance between the first device and the second device according to the location information of the first device and the location information of the second device,
    wherein the telephone number of the second device is included in associated information of the second device.

3. The device of claim 1, wherein the at least one processor is further configured to identify whether the first device and the second device are located within a coverage of a same base station based on associated information of the second device, identify the transmission method as a long distance communication transmission method when the first device and the second device are not located within the coverage of the same base station, and identify the distance between the first device and the second device and then the transmission method based on the identified distance when the first device and the second device are located within the coverage of the same base station.

4. The device of claim 3, wherein the at least one processor is further configured to acquire base station information of the second device by transmitting an instruction for acquiring the base station information of the second device having a telephone number to a server of a base station and identify whether the first device and the second device are located within the coverage of the same base station according to the base station information of the second device,
    wherein the telephone number of the second device is included in the associated information of the second device.

5. The device of claim 1, wherein the at least one processor is further configured to identify that the searched terminals comprise the second device when address information of the searched terminals comprise address information of the second device and identify that the searched terminals do not comprise the second device when the address information of the searched terminals do not comprise the address information of the second device,
    wherein the address information of the second device is included in associated information of the second device.

6. The device of claim 1, wherein the at least one processor is further configured to identify the transmission method as the short distance communication transmission method when the searched terminals comprise the second device and the second device is in an idle state and as the long distance communication transmission method when the searched terminals comprise the second device and the second device is in a busy state.

7. The device of claim 1, wherein, when the at least one processor identifies the transmission method as the long distance communication transmission method, the at least one processor is further configured to acquire a size of the file to be transmitted, identify the transmission method as a method of transmitting a file through a network application when the acquired size of the file to be transmitted is greater than or equal to a predetermined value, and identify the transmission method as a short message transmission method or a multimedia message transmission method when the acquired size of the file to be transmitted is less than the predetermined value,
    wherein account information of the network application associated with the second device and a telephone number of the second device are included in the associated information of the second device.

8. The device of claim 7, wherein, when the acquired size of the file to be transmitted is less than the predetermined value, the at least one processor is further configured to identify the transmission method as the short message transmission method or the multimedia message transmission method based on a format of the file to be transmitted.

9. A method of transmitting a file, the method being executed on a first device and comprising:
    obtaining a user input for selecting a file to be transmitted to a second device;
    identifying a transmission method based on a distance between the first device and the second device; and
    identifying the transmission method as a long distance communication transmission method in response to the distance between the first device and the second device being greater than a predetermined distance;
    searching for terminals which have turned on a short distance communication module of same type as a short distance communication module currently turned on in the first device when the distance between the first device and the second device is less than or equal to the predetermined distance;
    identifying the transmission method as one of a short distance communication transmission method and the long distance communication transmission method based on a state of the second device in response to identifying that the searched terminals comprise the second device;
    identifying the transmission method as the long distance communication transmission method in response to identifying that the searched terminals do not comprise the second device; and
    transmitting the file to the second device based on the identified transmission method,
    wherein the state of the second device comprises an idle state and a busy state.

10. The method of claim 9, wherein the identifying of the distance comprises:
    acquiring location information of the second device by transmitting a short message for acquiring the location information of the second device to a telephone number of the second device;
    acquiring location information of the first device; and
    identifying the distance between the first device and the second device according to the location information of the first device and the location information of the second device,
    wherein the telephone number of the second device is included in associated information of the second device.

11. The method of claim 9, wherein the identifying of the transmission method comprises:
    identifying whether the first device and the second device are located within a coverage of a same base station based on associated information of the second device;
    identifying the transmission method as the long distance communication transmission method when the first device and the second device are not located within the coverage of the same base station; and
    identifying the distance between the first device and the second device and then the transmission method based on the identified distance when the first device and the second device are located within the coverage of the same base station.

12. The method of claim 11, wherein the identifying of the transmission method further comprises acquiring base station information of the second device by transmitting an instruction for acquiring the base station information of the second device having a telephone number to a server of a base station and identifying whether the first device and the second device are located within the coverage of the same base station according to the base station information of the second device, and
    wherein the telephone number of the second device is included in the associated information of the second device.

13. The method of claim 9, wherein the identifying of the transmission method based on whether the searched terminals comprise the second device comprises
    identifying the transmission method as the short distance communication transmission method when the searched terminals comprise the second device and the second device is in an idle state and as the long distance communication transmission method when the searched terminals comprise the second device and the second device is in a busy state.

14. The method of claim 9, further comprising:
    acquiring a size of the file to be transmitted when the transmission method is identified as a long distance communication transmission method;
    identifying the transmission method as a method of transmitting a file through a network application when the acquired size of the file to be transmitted is greater than or equal to a predetermined value; and
    identifying the transmission method as a short message transmission method or a multimedia message transmission method when the acquired size of the file to be transmitted is less than the predetermined value,
    wherein account information of the network application associated with the second device and a telephone number of the second device are included in the associated information of the second device.

15. The method of claim 14, further comprising, when the acquired size of the file to be transmitted is less than the predetermined value, identifying the transmission method as the short message transmission method or the multimedia message transmission method based on a format of the file to be transmitted.

16. A computer program product comprising a non-transitory computer readable storage medium having a computer readable program stored therein, wherein the computer readable program, when a short distance communication transmission method based on a distance between a first device and a second device, and control a communication unit to transmit a file to the second device according to the identified transmission method,
    identify the transmission method as the long distance communication transmission method when the distance between the first device and the second device is greater than a predetermined distance,
    search for terminals which have turned on a short distance communication module of the distance between the first device and the second device is less than or equal to the predetermined distance, identify the transmission method as one of the short distance communication transmission method and the long distance communication transmission method based on a state of the second device in response to identifying that the searched terminals comprise the second device, and identify the transmission method as the ions distance communication transmission method in response to identifying that the searched terminals do not comprise the second device, wherein the state of the second device comprises an idle state and a busy state.

* * * * *